United States Patent [19]

Martin, Jr.

[11] Patent Number: 4,675,933
[45] Date of Patent: Jun. 30, 1987

[54] OFFSET WIPER DRIVE

[76] Inventor: Robert P. Martin, Jr., c/o Martin Sheet Metal, Inc., 7108 Madison Ave., Cleveland, Ohio 44102

[21] Appl. No.: 777,937

[22] Filed: Sep. 19, 1985

[51] Int. Cl.⁴ .............................. B60S 1/18; B60S 1/24
[52] U.S. Cl. ................................ 15/250.3; 15/250.23; 15/250.34; 296/102; 296/190
[58] Field of Search ............. 15/250.3, 250.23, 250.34, 15/250.19; 296/102, 190

[56] References Cited

U.S. PATENT DOCUMENTS

| | | | |
|---|---|---|---|
| 1,657,335 | 1/1928 | Ahlm | 15/250.30 |
| 2,010,693 | 8/1935 | Hueber et al. | 15/250.30 |
| 4,133,574 | 1/1979 | Martin | 296/190 |
| 4,266,315 | 5/1981 | Skahill | 15/250.19 |

FOREIGN PATENT DOCUMENTS

| | | | |
|---|---|---|---|
| 2334554 | 7/1977 | France | 296/190 |
| 57-95261 | 6/1982 | Japan | 296/190 |

OTHER PUBLICATIONS

John Deere, *Leave Your Tractor-Driving Safety to This Question*, C574-67-12 Wat. Litho in USA.

Primary Examiner—James Kee Chi
Attorney, Agent, or Firm—Pearne, Gordon, McCoy & Granger

[57] ABSTRACT

A windshield wiper drive system for an industrial lift truck cab which affords a high degree of forward visibility, ease of construction and assembly, and simple operation. The system includes a centrally mounted pivot shaft coupled by a connecting link to a laterally offset gear motor drive. The gear motor drive is a right-angle unit that is mounted in a manner which substantially eliminates obstruction of the operator's view as bounded by the front of the cab structure.

3 Claims, 3 Drawing Figures

OFFSET WIPER DRIVE

BACKGROUND OF THE INVENTION

The invention relates to improvements in lift truck cabs and, in particular, to an improved windshield wiper drive arrangement for such cabs.

Cabs for industrial lift trucks afford protection to the operator from weather, dust, and other adverse environmental conditions. Typically, such cabs are fitted with large window areas to provide a high degree of visibility to the operator for both driving the vehicle through restricted paths and manipulating a load on and off the lift forks. It is customary to provide a single windshield wiper and motor drive adjacent the center of the upper region of a windshield so that it sweeps a central symmetrical area of the windshield. The physical size of a conventional wiper motor and gear drive is large in comparison to a typical cross-tie tube element used as a header across the upper edge of the windshield. As a result, in prior lift truck cabs, the wiper motor assembly often obstructs the operator's upper field of vision.

An arrangement where the pivot shaft for the wiper arm extends under the cross-tie tube presents other disadvantages in addition to direct obstruction of the view. If a front panel area below the cross-tie member is provided for carrying the pivot shaft, and such panel area is extended horizontally, the panel area contributes significantly to the loss of upper field vision. If the front panel area below the cross-tie carrying the pivot shaft is profiled to increase visibility, manufacturing expense is increased because of the complexities introduced by cutting the windshield glass on an irregular line.

SUMMARY OF THE INVENTION

The invention provides a windshield wiper drive system for a lift truck cab which includes a centrally mounted wiper arm and a laterally mounted drive motor that affords a high degree of visibility. The pivot shaft is mounted within the height of the cross-tie so that the field of view in front of the operator is not obstructed by a depending portion of a front panel otherwise serving to support the pivot shaft. The motor is mounted adjacent a corner post of the cab where it avoids obstruction of front vision.

In the illustrated embodiment, the motor unit includes a right-angle gear drive. The output shaft of the motor unit is below the lower extremity of the cross-tie. The output shaft rotates a drive arm that oscillates a crank arm on the pivot shaft through an interconnected reciprocating link. The line action of the link is inclined upwardly from the output shaft of the motor gear drive unit to the pivot drive arm to accommodate the difference in elevation between these elements. The motor drive unit is oriented in such a manner that, in addition to providing a simple linkage operating substantially in a single plane, it frames the operator's forward view with limited encroachment. This limited intrusion on the operator's vision is achieved by an arrangement where the gear box of the motor drive unit is most remote from the pivot shaft at the corner of the cab, and the motor extends back along a line generally parallel to the cross-tie, with the centerline of the motor above the centerline of the output shaft of the gear box.

DESCRIPTION OF THE PREFERRED EMBODIMENT

Figure 1:
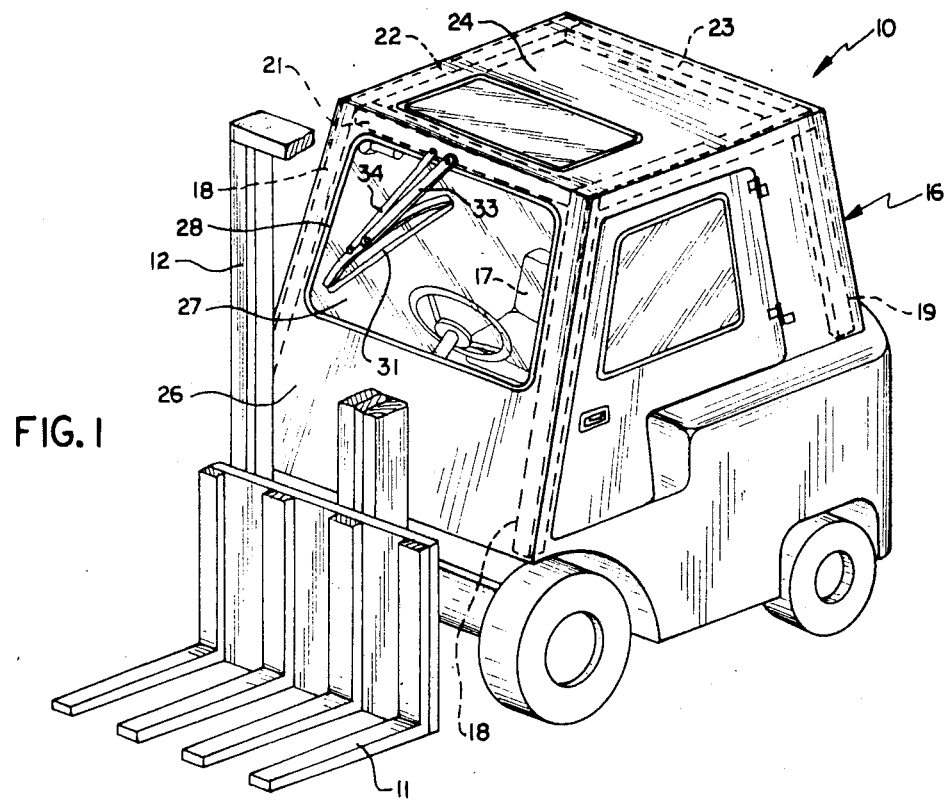
FIG. 1 is a somewhat schematic, perspective view of a lift truck and cab in which the present invention is incorporated.
Figure 2:
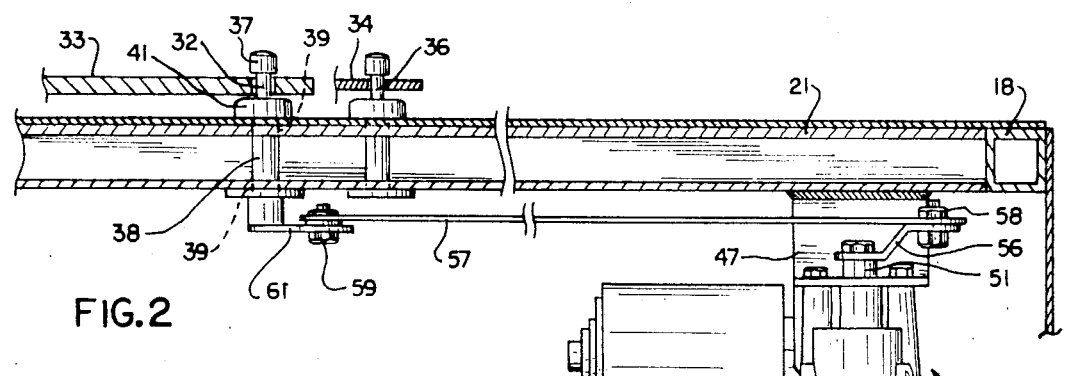
FIG. 2 is a fragmentary plan view of a windshield wiper drive system of the invention in the lift truck cab of FIG. 1.

Referring now to the drawing, there is illustrated an industrial lift truck vehicle 10 having at its front end conventional lift forks 11 mounted for vertical movement along a mast 12. A rigid cab 16 is provided on the lift truck 10 to enclose the operator's station, represented by a seat of chair 17 in which the driver of the lift truck sits when operating the same. The cab 16, which extends generally from one side of the truck to the other, provides overhead protection to the operator from falling objects. Additionally, the cab isolates the operator from environmental conditions, such as rain, dust, and the like.

In accordance with conventional practice, the cab 16 is fabricated as a weldment of steel components for strength and rigidity. The illustrated cab 16 includes a set of four generally vertically corner posts 18, 19 and four interconnected, generally horizontal, elongated crosspieces 21, 22, and 23. The corner posts 18, 19 and crosspieces 21-23 are conveniently formed of rectangular or square steel tubing welded together at their intersecting ends. A generally rectangular sheet of steel 24 spans the area between the crosspieces 21-23, and is attached to such elements to form a rigid roof barrier. Doors (not shown) can be hinged on both sides of the cab 16 to enclose the sides thereof. A steel front panel 26 is welded on the frontward faces of the front corner posts 18. This front panel 26 provides a large rectangular or trapezoidal opening for a similarly shaped windshield 27 of glass or other transparent material. The windshield 27 is mounted on the panel 26, for example, by conventional rubber molding 28. As illustrated, the plane of the windshield 27 is parallel to the plane formed by the front corner posts 18. The operator's seat 17 is generally centrally disposed on the truck in a side-to-side or a lateral sense. Accordingly, the forward view or line of sight of the operator extends generally through the vertical centerline of the windshield 27.

The windshield 27 is served by a wiper blade 31 that sweeps in an arc about a pivot shaft 32 carried on the front cross-tie 21. Preferably, in a known manner, the blade 31 is articulated on a main arm 33 and, under control of a second arm 34, maintains a generally constant vertical orientation as it swings from one vertical edge of the windshield 27 to the other. The second arm 34 is pivotal at its upper end on a pin 36, also carried on the cross-tie 21.

Figure 3:
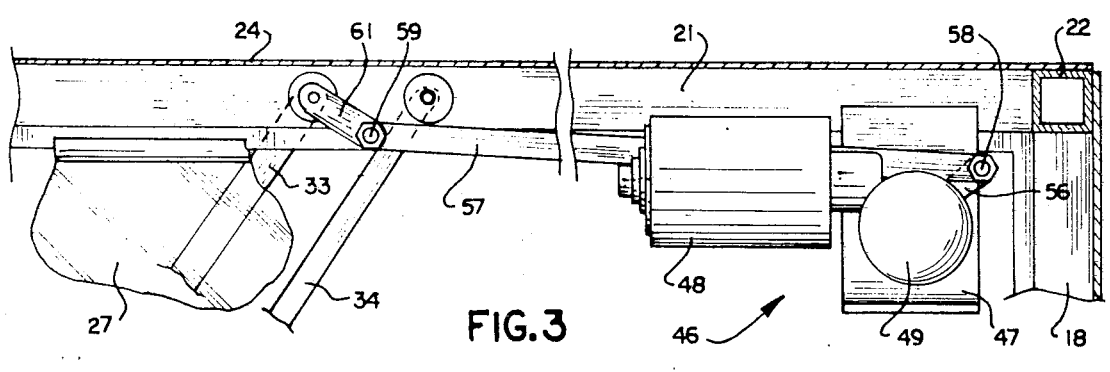
FIG. 3 is a fragmentary, elevational view of the windshield wiper drive system.

The arm 33 is conventionally keyed on the pivot shaft 32 and retained thereon by a nut 37. The shaft 32 is pivotally supported in a bushing 38 assembled through holes 39 in the front and rear faces of the front cross-tie piece 21. The bushing 38 is held in place on the cross-tie 21 by a nut 41 threaded onto its exterior and tightened against the front face of the cross-tie 21. As indicated in FIG. 3, the bushing 38 and pivot shaft 32 are supported in the cross-tie 21 substantially at the middle of the vertical height of the cross-tie. Likewise, the bushing 38 and pivot shaft 32 are located generally at the middle of the horizontal length of the cross-tie 21 so that the arm 33 and wiper blade 31 are suspended from a point above the windshield and on an imaginary, generally vertical centerline of the windshield.

A windshield wiper drive motor unit 46 is mounted on a bracket 47 in the interior of the cab 16 adjacent one of its front corner posts 18. In the illustrated case, the unit 46 is adjacent the right corner post 18 with reference to the driver's orientation. The motor unit 46 is preferably a commercially available device of a generally conventional construction, and includes an electric rotary motor 48 bolted to a right-angle gear box or speed reducer 49. In a typical manner, the motor 48 drives a worm gear carried on its shaft within the housing of the gear box 49 and the worm gear rotates a mating gear and an output shaft 51 to which such mating gear is affixed about an axis perpendicular to the motor axis. As indicated in FIG. 3, the axis of the output shaft 51 is vertically spaced below the elevation of the pivot shaft 32, as well as the axis of the motor 48. The longitudinal axis of the motor 48 is in substantial parallel alignment with the front cross-tie 21, and the case of the motor is closely adjacent the plane of the roof panel 24. The gear box 49, which is bolted to the bracket 47, is closely adjacent the rightward corner post 18. The bracket 47 is welded or otherwise fixed to the structure of the cab 16. The output shaft 51 projects through a hole in the bracket 47. This gear box shaft 51 extends in a generally horizontal direction perpendicular to the plane of the windshield 27.

A drive arm 56 is fixed on the outboard end of the gear box output shaft 51. An elongated connecting link 57 has one of its ends pivotally connected by a pin 58 to the free end of the drive arm 56. The opposite end of the connecting link 57 is pivotally connected by a pin 59 to a crank or pivot arm 61. The pivot shaft 32 and gear box output shaft 51 are substantially parallel, thereby simplifying the kinematics of the arms 33, 56 and connecting link 57. Any limited non-parallelism between the shafts 32, 51 is accommodated by self-aligning bearings in the pin joints of the arms 56, 61. Operation of the motor 48, under control of an electrical switch (not shown), causes the output shaft 51 to rotate at a moderate speed. This rotation causes the connecting link 57 to reciprocate along directions generally parallel to a line between the output shaft 51 and the free end of the crank arm 61 and, as a consequence, causes the crank arm, wiper arm 33, and blade 31 to oscillate. The wiper arm 33, in accordance with conventional practice, can include a joint near the pivot shaft 32 to permit it to be biased against the windshield 27 by a spring (not shown).

Since, as shown, the diameter of the motor 48 is generally equal in dimension to that of the vertical extent of the front cross-tie 21, and the motor is closely adjacent the plane of the roof panel 24, the motor does not significantly obstruct forward vision through the windshield 27. While the gear box 49 depends to a horizontal plane which is some distance below the lower extent of the cross-tie and window molding 28 on the upper edge of the windshield 27, it is laterally displaced from the center of the windshield to a point adjacent the rightward corner post 18. At this lateral position, the gear box 49 does not interfere with forward vision of the operator, and does not significantly diminish the field of view from that limited by the adjacent corner post 18. From the operator's position, the gear box 49 generally lies in the line of vision necessarily blocked by this adjacent front corner post 18.

While the invention has been shown and described with respect to a particular embodiment thereof, this is for the purpose of illustration rather than limitation, and other variations and modifications of the specific embodiment herein shown and described will be apparent to those skilled in the art within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A cab for a lift truck comprising a rigid frame including a set of four generally vertical corner posts framing front, side, and rear faces of the cab, elongated generally horizontal cross-tie elements interconnecting the corner posts at their upper ends, a front one of said cross-tie elements extending between a front pair of said corner posts and having a configuration to provide a major portion of the overhead strength of the cab in the adjacent cab area, means supported by said frame forming a roof, the front edge of the roof being supported by said front cross-tie in a manner wherein obstruction of the forward and upward view afforded the operator is limited substantially to the vertical height of the front cross-tie element and thickness of the sheetlike roof, a windshield extending across a major portion of the front cab face, a pivot shaft extending generally horizontally through said front cross-tie at its midlength, a wiper blade depending from an outward end of the pivot shaft and adapted to sweep across the outside surface of the windshield, a crank arm fixed on the inner end of the pivot shaft in the interior of the cab and depending below the axis of the pivot shaft, a gear motor drive unit mounted within the cab adjacent one of the front corner posts, said gear motor drive unit including a rotary electric motor and a right-angle drive gear box, the motor being aligned with its axis of rotation generally parallel to the front cross-tie and being closely adjacent the plane of the roof, said motor being disposed between said gear box and said pivot shaft, said gear box including a rotary output shaft having an axis generally parallel to said pivot shaft and being disposed vertically below said pivot shaft, a drive arm fixed to said output shaft, a connecting link pinned at one end to a free end of said drive arm and pinned at its opposite end to a free end of the crank arm, rotation of said output shaft induced by rotation of said motor causing said drive arm to rotate, said connecting link to reciprocate, and said crank and wiper to oscillate, the position of said gear motor drive avoiding obstruction of the operator's straight-ahead view through said windshield while permitting operation of said wiper through a kinematically simple drive.

2. A lift truck cab as set forth in claim 1, wherein said front cross-tie element is tubular, said pivot shaft extending through front and rear faces of said tubular element.

3. A lift truck as set forth in claim 2, wherein said front cross-tie element is formed of rectangular steel tubing.

* * * * *